(12) United States Patent
Lott et al.

(10) Patent No.: US 9,549,341 B2
(45) Date of Patent: Jan. 17, 2017

(54) METHOD AND NETWORK ELEMENT FOR TRAFFIC FLOW TREATMENT IN A CORE NETWORK OF A COMMUNICATION NETWORK

(75) Inventors: Matthias Lott, Planegg (DE); Joachim Kross, Munich (DE); Gerhard Kuhn, Munich (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 31 days.

(21) Appl. No.: 14/390,298

(22) PCT Filed: Apr. 3, 2012

(86) PCT No.: PCT/EP2012/056055
§ 371 (c)(1),
(2), (4) Date: Jan. 12, 2015

(87) PCT Pub. No.: WO2013/149652
PCT Pub. Date: Oct. 10, 2013

(65) Prior Publication Data
US 2015/0117204 A1    Apr. 30, 2015

(51) Int. Cl.
*H04W 28/02* (2009.01)
*H04W 28/10* (2009.01)
(Continued)

(52) U.S. Cl.
CPC ........ *H04W 28/0289* (2013.01); *H04L 45/306* (2013.01); *H04L 45/308* (2013.01);
(Continued)

(58) Field of Classification Search
None
See application file for complete search history.

(56) References Cited

U.S. PATENT DOCUMENTS

2005/0041584 A1   2/2005 Lau et al.
2007/0286353 A1*  12/2007 Itoh .................. H04L 12/66
                                                    379/37
(Continued)

FOREIGN PATENT DOCUMENTS

WO    WO 2011/160660    12/2011

OTHER PUBLICATIONS

International Search Report dated Sep. 13, 2012 corresponding to International Patent Application No. PCT/EP2012/056055.

*Primary Examiner* — Chi H Pham
*Assistant Examiner* — Soon-Dong D Hyun
(74) *Attorney, Agent, or Firm* — Squire Patton Boggs (US) LLP (57) ABSTRACT

The present invention relates to a method for traffic flow treatment in a core network of a communication network. The method may comprise receiving cell information from an access network of the communication network, wherein the received cell information comprises an indication of a congested cell of the communication network. Furthermore, the method may comprise receiving subscriber specific information comprising real-time information of a subscriber in a cell of the communication network. The method may further comprise analyzing the received subscriber specific information and controlling the traffic flow in the core network according to the analysis of the subscriber specific information.

14 Claims, 5 Drawing Sheets

(51) Int. Cl.
*H04L 12/725* (2013.01)
*H04L 12/721* (2013.01)
*H04L 12/26* (2006.01)

(52) U.S. Cl.
CPC ......... *H04W 28/10* (2013.01); *H04L 43/0882* (2013.01); *H04L 45/70* (2013.01)

(56) References Cited

U.S. PATENT DOCUMENTS

| | | | | |
|---|---|---|---|---|
| 2010/0323662 A1* | 12/2010 | Dahlen | ................ | H04W 48/02 455/410 |
| 2011/0158090 A1* | 6/2011 | Riley | .................... | H04L 12/14 370/230 |
| 2012/0002545 A1* | 1/2012 | Watfa | ................... | H04W 48/06 370/235 |
| 2012/0163203 A1* | 6/2012 | Wilkinson | .......... | H04L 41/5025 370/252 |
| 2013/0035064 A1* | 2/2013 | Balachandran | ....... | H04W 48/02 455/411 |

* cited by examiner

METHOD AND NETWORK ELEMENT FOR TRAFFIC FLOW TREATMENT IN A CORE NETWORK OF A COMMUNICATION NETWORK

TECHNICAL FIELD

Embodiments of the present invention relate generally to mobile communications and more particularly to network elements and methods in communication networks. More specifically, it relates to a method for traffic flow treatment in a core network of a communication network, network elements, a computer program product and a computer-readable medium.

In the next years a significant increase in mobile data traffic may be expected. This mobile traffic may be caused by mobile telecommunication equipment, such as laptops using dongles, smart phones and tablet PCs, for example iPads. Moreover, future applications may increase in bandwidth. Thus, there may be a need to reduce the costs per transferred bit.

Application differentiation may be one possibility for utilizing the communication infrastructure in an efficient way and to address the traffic increase considering the different Quality of Service (QoS) requirements of the applications. A further possibility may be to distinguish according to subscriber perceived service quality, for example Quality of Experience (QoE). Therefore, it could be possible that sensitive applications are scheduled with higher priority while less important traffic, for example P2P file downloading traffic may be scheduled with lower priority or may be throttled. These solutions for application differentiation may be proposed by different network vendors and may depend on the installed equipment of the Communication Service Providers (CSP).

Fluctuating capacity over the air may spoil the user experience for bandwidth sensitive applications. High volume services, such as P2P file downloading may impact negatively interactive services, such as browsing. Furthermore, in case of congested cells, the subscriber level in relation to QoS may not separate different applications within a single bearer, which may provide difficulties for an effective usage at application level.

At present these observations may occur in communication networks based on 3G/HSPA technology, where most of the mobile devices do not support a secondary PDP context. Such a secondary PDP context would enable traffic of different applications to be mapped to different bearers to which different QoS levels could be assigned.

Some of the present solutions try to detect the congestion and perform the packet treatment on RAN level. However, on RAN level the specific applications running over a single bearer as well as policies may not be known. Traffic flow identification in general may be performed in the core network by means of for example deep packet inspection (DPI). The policies are only known in the core at present, for example in a Policy and Charging Rules Function (PCRF).

There may be several approaches in order to detect and treat the traffic in the RAN. However, only few mechanisms are known that could be applied in the core network for application differentiation. Currently, the most common way of bandwidth management may be based on long-term statistics that are derived in the core network, and based on these forecasts the traffic may be treated correspondingly. For example, in busy hours it may be expected that the cells are highly loaded or congested and all low priority traffic, such as P2P file downloading traffic may be throttled independently of whether the cell carrying this traffic is really congested at that time or not.

Other proposals for cell load detection may be based on the evaluation of Transmission Control Protocol (TCP) flow behavior, wherein a TCP may be understood as a protocol that provides the transport service located in the transport layer of the open systems interconnection (OSI) model. These approaches may be based on the typical characteristics, whereas an assumption may be made whether the cell, representing one end of one or more TCP flow(s), is congested or not.

All these proposed mechanisms may not be as accurate as measurements in the Radio Access Network (RAN) or even on cell level, and also not as fast. Finally, it is still an open question how to decide which traffic flows belong to the congested cell and which flows should be treated correspondingly, for example throttled. Thus, there may be a need to control traffic of congested cells.

SUMMARY OF THE INVENTION

According to an exemplary embodiment of the present invention, a method for traffic flow treatment in a core network of a communication network is provided. The method may comprise receiving cell information from an access network of the communication network, wherein the received cell information comprises an indication of a congested cell of the communication network. Furthermore, the method may comprise receiving subscriber specific information comprising real-time information of a subscriber in a cell of the communication network. The method may further comprise analyzing the received subscriber specific information and controlling the traffic flow in the core network according to the analysis of the subscriber specific information.

Subscribers may be users in a communication network, utilizing user equipment, such as mobile devices, for example laptops with wireless radio connections, mobile phones, smart phones and the like.

A congested cell may be understood as a cell with a high cell load. An exemplary indication of a congested cell may be a mismatch between a requested and a provided throughput if the provided throughput is below a pre-defined minimum threshold. In a special case where the requested throughput may be below the minimum threshold, the provided throughput being below the requested throughput would be considered as an indication. Further definitions of indications and of cell congestion and of high cell load may be available and may be applicable in this context.

A congested cell may be caused for example by unfavorable radio conditions or too many users or too many services or too many resource requests or combinations thereof.

Before receiving subscriber specific information there may be provided for identifying one or more subscribers. The identification may comprise a subscriber ID. It may be foreseen to receive all subscribers IDs of the users in a congested or overloaded cell.

The received cell information may comprise an indication of a congested cell of the communication network. This cell information may originate from a RAN.

According to an exemplary embodiment it may be foreseen to identify a congested cell utilizing information from a RAN.

A real-time information of a subscriber may be a location of the subscriber or an indication that the subscriber is located at present in a congested cell. Real-time may be understood in this context, that the information is representing a current situation of a subscriber, which may be updated in a scale of milliseconds or seconds.

The real-time information of the subscriber may be analyzed, wherein the analysis may comprise an evaluation of the location of the subscriber, an evaluation of an application of the subscriber utilized by the subscriber at present, the throughput offered to the subscriber, or the like.

Based on the real-time information of the subscriber the network element installed in the core network may receive location information. Thus, in the core network knowledge would be available by which cell or eNodeB a traffic flow may be served. In addition in the core network there may also be knowledge available of flows due to handovers and load balancing decisions performed in the RAN.

The method may provide a QoS solution that may consider congestion in a radio cell by means of measurements in the RAN. After analyzing the information of the RAN of a specific subscriber the traffic may be treated according to the application requirements utilized by that subscriber as well as other subscribers in the same cell and according to operator policies that may be known in the core network, for example in the PCRF. Thus, an adaptation in relation to traffic may be provided for the monitored subscriber as well as for further subscribers not monitored by measurement but located in the congested cell.

The method may further comprise requesting subscriber-specific information of the subscriber located in the congested cell.

Requesting subscriber-specific information may support the analysis performed in the core network. In addition to already received subscriber information in the core network, a network element installed in the core network, for example an OSS, may request subscriber information from the RAN. This request may be performed for initiating the analysis within the core network and/or during the analysis.

According to an exemplary embodiment of the present invention, the method may further comprise receiving cell information as a real-time information.

It may be foreseen to analyze both the subscriber specific information and the cell information in order to perform traffic management.

Moreover, it may be foreseen to receive information to identify subscriber specific information of a subscriber located in a congested cell. The receiving may be based on requesting information.

According to an exemplary embodiment of the present invention, the method may further comprise sending a trigger signal for updating a policy of the subscriber in the core network.

A trigger signal may be sent in case a measurement or measured value may fall below a threshold for example a threshold in relation to a bandwidth. A device installed in the core network may provide a trigger signal, for example an OSS.

According to an exemplary embodiment of the present invention, the method may further comprise reporting detected service traffic within the core network.

Service traffic may be understood as traffic requested by a subscriber. The subscriber may demand a certain kind of service or different kind of services in parallel. Services for example may be browsing, uploading data and video streaming.

According to an exemplary embodiment of the present invention, it may be provided that the method may comprise controlling data flow of a certain kind.

It may be provided controlling data flow of a certain kind in the core network. It may be possible to control a specific kind of data flow. For example it may be provided controlling only browsing of several users in parallel in a congested cell. It may also be possible to control all user data relating to video streaming in a congested cell. Another possibility it to control a certain group of users within a cell or to control all users comprising a certain kind of characteristic, such as requested service. Thus, the core network, especially one or more network elements in the core network, may control all users in a congested cell or selected users in a congested cell.

According to an exemplary embodiment of the present invention, the method may further comprise updating subscriber-specific policy in the core network.

Updating subscriber-specific policy may be performed in order to guarantee available bandwidth for sensitive applications, such as real-time applications like video-streaming.

According to an exemplary embodiment of the present invention, the method may further comprise identifying of applications to manage traffic.

Identifying of applications to manage traffic may be performed in the core network.

Traffic management may comprise different actions in relation to the traffic, such as throttling, packet marking, prioritization of the packet traffic, mapping to different PDP-contexts with different QoS properties and trans-coding of for example video-streams and combinations thereof. The traffic management may for example be performed in the core network and/or in the RAN and/or in co-operation between core and RAN, depending on the specific management action.

Applications which are not sensitive or time critical such as downloading may be reduced in bandwidth availability. Therefore, sensitive applications running in parallel by the same subscriber or a different subscriber may receive more bandwidth in order to provide service with higher QoE.

According to an exemplary embodiment of the present invention, the method may further comprise controlling the traffic flow in the core network according to the policies of the core network.

Elements installed in the core network may provide policies or rules in order to control traffic or traffic flow.

According to an exemplary embodiment of the present invention, the method may further comprise utilizing PDP context in the core network.

According to an exemplary embodiment of the present invention, the method may further comprise receiving application information.

It may be foreseen to receive application information by utilizing deep packet inspection (DPI) in the core network. Traffic flows, e.g. identified by means of DPI or other methods, and corresponding polices can be treated appropriately according to a traffic management action. It is not known in the core which traffic streams belong to a highly loaded cell. Furthermore, appropriate measurements to determine the cell load conditions are not available in the core, and neither are there triggers available that initiate the process of application aware traffic management in case of high cell load or cell congestion.

It would be possible to receive application information for example by Shallow Packet Inspection (SPI) or DPI or other packet inspection means for identifying a traffic flow. Besides packet inspection, explicit notification by e.g. IMS or other functionality or server could be applicable as well.

According to an exemplary embodiment of the present invention, the method may further comprise utilizing information from an Internet Protocol Connectivity Access Network (IPCAN) session in the core network.

According to an exemplary embodiment of the present invention, there may be provided a network element installed in a core network. The network element may comprise a receiving element for receiving cell information and/or for receiving subscriber-specific information comprising real-time information of a subscriber in a cell of the communication network. The network element may further comprise an analyzing element for analyzing the received subscriber-specific information and a sending element for sending controlling information in order to control the traffic flow in the core network according to the analysis of the subscriber-specific information.

The network element may be an operation support system (OSS). A PCRF may be another network element, which may work together with the OSS and which may be connected to each other. The OSS may transfer received information, which may be sent to the PCRF. This information may include real-time information and/or analysis results of analysis performed by the OSS.

According to an exemplary embodiment of the present invention, a further network element installed in a core network may be provided. This network element may comprise a receiving element and a sending element and may be for example a policy and charging rules function element (PCRF).

According to an exemplary embodiment of the present invention, there may be provided a computer program product comprising code portions for causing a network element on which the computer program is executed to carry out the method according to the invention.

According to an exemplary embodiment of the present invention, there may be provided a computer-readable medium embodying the computer program product.

It may be understood that features described in relation to the method may be executable on the elements and the network systems according to the present invention.

BRIEF DESCRIPTION OF THE DRAWINGS

Exemplary embodiments of the present invention are described below with reference to the accompanying drawings, which are not necessarily drawn in scale, wherein.

DETAILED DESCRIPTION

Figure 1:
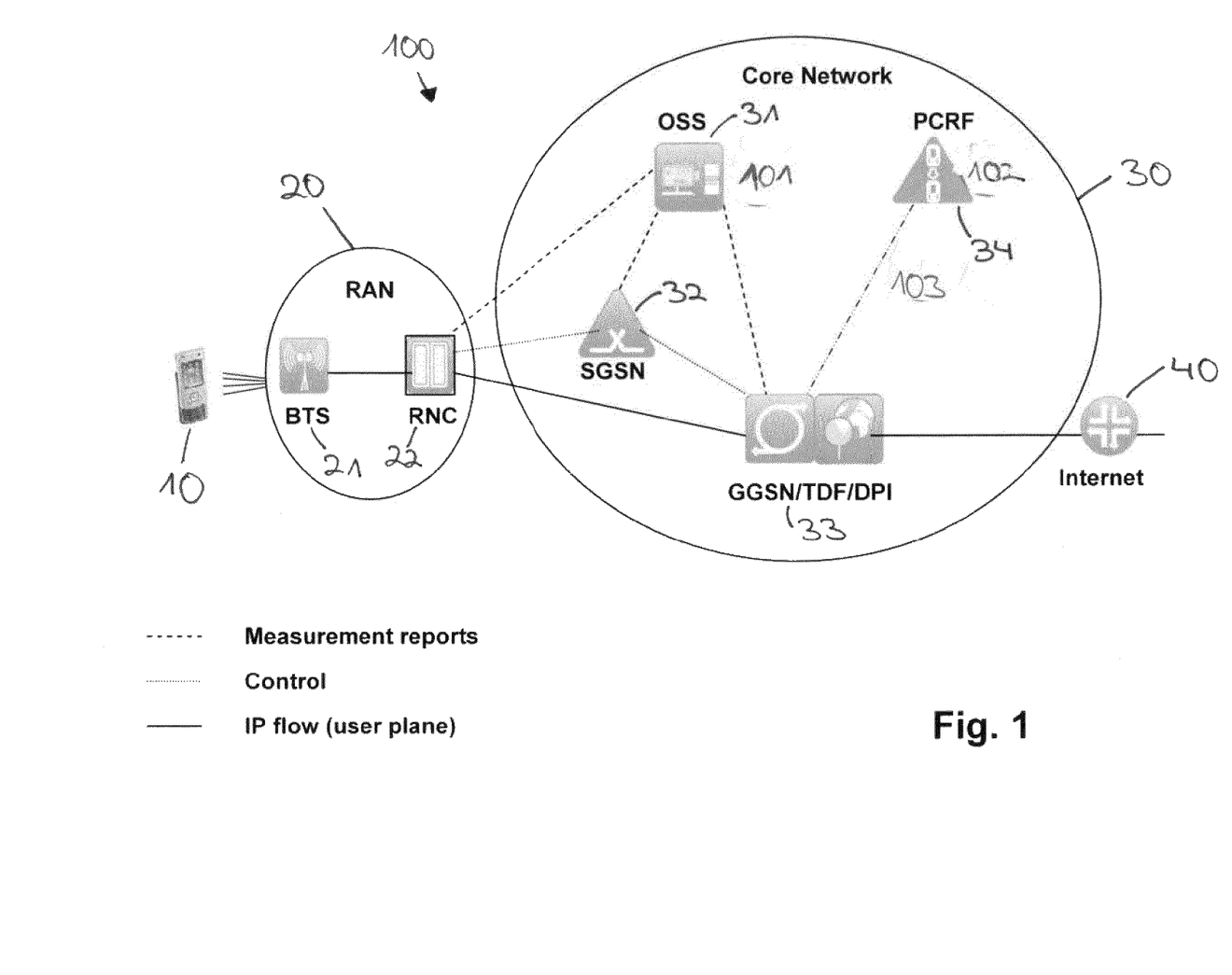
FIG. 1 illustrates an exemplary embodiment of an existing network configuration.

FIG. 1 illustrates an exemplary embodiment of an existing network configuration. A communication network 100 comprises a radio access network (RAN) 20 and a core network (CN) 30. The radio access network 20 and the core network 30 are connected to each other, wherein the radio access network 20 provides a radio access for user equipments, in FIG. 1 for user equipment (UE) 10. This user equipment 10 may be a mobile phone, a portable computer or the like. The UE 10 may be connected to the radio access network 20 over the core network 30 to the internet 40. FIG. 1 shows an IP flow for the UE 10 in a user plane.

The RAN 20 comprises a Base Transceiver Station (BTS) 21 and a Radio Network Controller (RNC) 22. The BTS 21 is a network element in the mobile network responsible for radio transmission and reception to or from the mobile station.

Moreover, the core network 30 in FIG. 1 comprises an Operations Support System (OSS) 31 which is connected with the RNC 22 of the radio access network. Furthermore, the OSS 31 is connected with a Serving GPRS Support Node (SGSN 32) and to a Gateway GPRS Support Node (GGSN) 33. The GGSN 33 is connected to the RNC 22 and to a PCRF 34 in the core network. Furthermore, the GGSN 33 provides a connection from the core network 30 to the internet 40. Although the exemplary embodiments are described for 3G, the idea of the invention is also applicable for 4G technologies or the like, whereby the described functionalities may be adapted accordingly.

The IP flow in the user plane of the UE 10 has a path from the UE 10 over the BTS 21, the RNC 22, the GGSN 33 to the internet 40 and vice versa. The OSS 31 receives measurements from the RAN 20, especially from the RNC 22 and provides statistics within the core network 30, which may be daily statistics. The PCRF 31 is updated with this statistical information which may be statistical cell load information of the radio access network. As an alternative the functionality of updating may be provided without utilizing any PCRF element 31. Instead of the PCRF another network element may provide the functionality. For example the updating of statistical data may be performed by the OSS.

Moreover, the PCRF 34 modifies policy dependent on statistics and cell location of UEs 10 or subscribers during an attachment. However, no actual location information of a subscriber is available in the core network so far. The statistics are received by the OSS 31, which is indicated by 101. The update of statistical data in the PCRF 34 is indicated by 102. Sending data from the PCRF 34 to the GGSN 33 comprising policy information is indicated by 103. In summary the OSS 31 provides an overview of statistics and evaluations including alert measures for a network operator. However, the OSS 31 does not control further processes within the core network.

Figure 2:
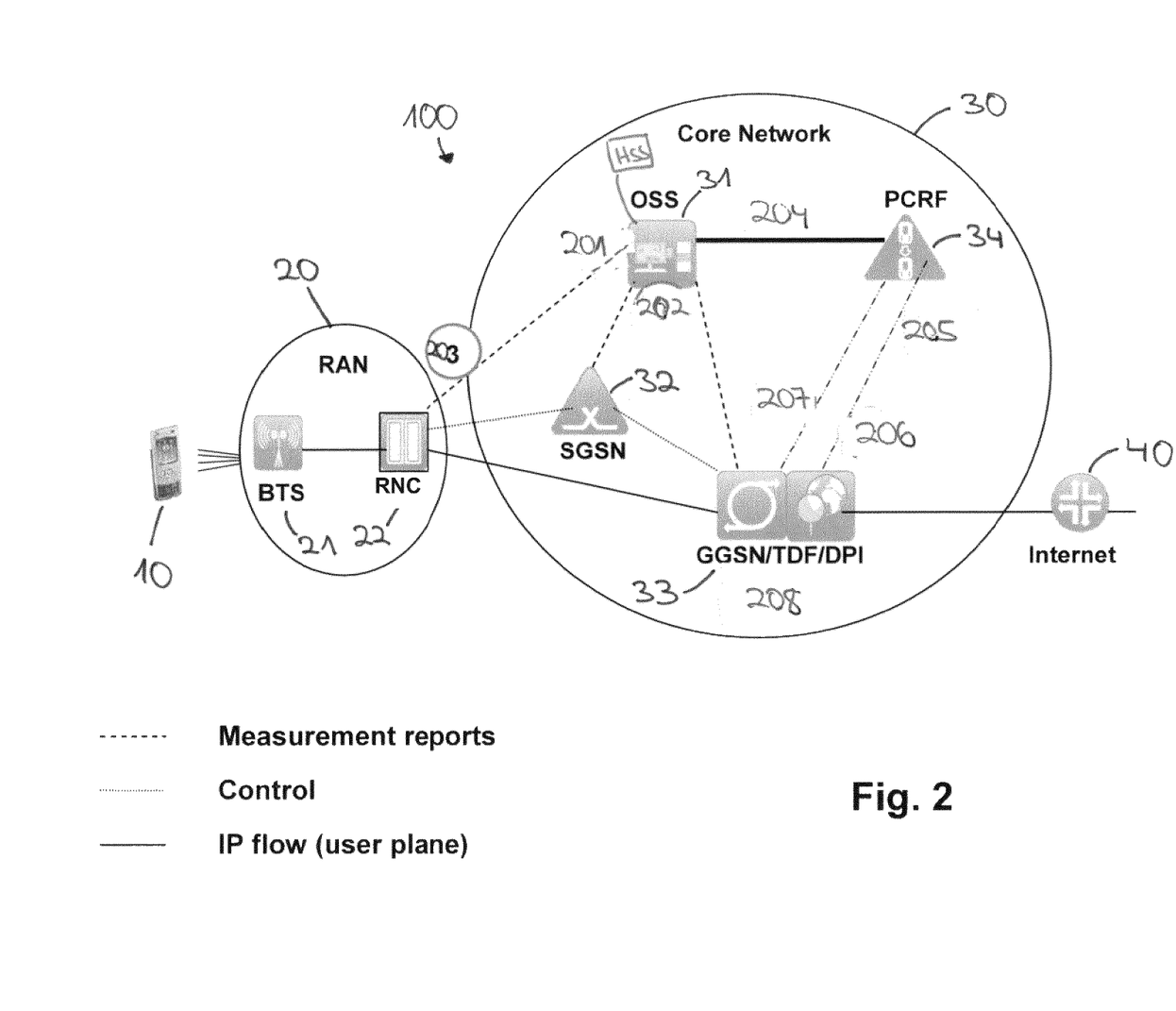
FIG. 2 illustrates an exemplary embodiment of a network configuration according to the present invention.

FIG. 2 illustrates an exemplary embodiment of a network configuration comprising features of the present invention. FIG. 2 shows a similar network configuration as described already in FIG. 1. As in FIG. 1 the UE 10 initiates an IP flow in the user plane in order to be connected with the internet 40 over the RAN 20 and the core network 30. In FIG. 2 the BTS 21 of the RAN 20 in combination with the RNC 22 provides measurements to the OSS 31 installed in the core network, which is indicated in 201. The OSS 31 evaluates the received measurements, indicated in 202 and requests from the RNC 22 identities of subscribers 10. The request of identities of subscribers is triggered by a received information in the OSS 31 comprising an indication of a congested cell. Afterwards, the OSS 31 determines a responsible PCRF 34 within the core network 30 and sends a trigger signal to the PCRF 34 in order to update a policy of the concerned subscribers due to the information of a cell congestion. This is indicated by 204. Moreover, the PCRF 34 distinguishes user types for example with low priority, with high priority or special subscribers. The PCRF 34 determines bearers for impacted subscribers, which may be provided by the information of PDP contexts and/or GGSN/TDF (Traffic Detection Function). As indicated in 205 the PCRF 34 triggers TDF in order to report detected service traffic. The TDF 33 informs the PCRF 34 about detected service traffic, for example detected analyzed application, indicated in 206. Afterwards, the PCRF 34 updates the policy of detected users, for example subscriber-specific policy in the GGSN/DPI 33, indicated in 207. Finally the Policy and Charging Enforcement Function (PCEF) of the GGSN performs traffic management by throttling traffic of requested applications according to the policy of the core network 30, indicated in 208. Alternatively, specific streaming sessions could be trans-coded to reduce the overall bandwidth requirement and, hence, resolve the congestion situation. The DPI may be utilized for detection. Thus, the PCRF may provide a policy for a traffic management to the GGSN and in addition the PCRF or the GGSN may provide an enforcement of traffic management.

In FIG. 2 it is proposed a solution for 3G technology, for example HSPA, for selective packet treatment in the core network based on high cell load triggers from for example the OSS 31. Measurement reports, indicated in dotted lines in FIG. 2 may be retrieved from the RAN 20. It may be provided an identification of all PDP contexts of a congested cell, wherein the identification takes place in the core network 30 and a treatment of the traffic is provided in the core network 30 according to the policies of the PCRF 34 installed in the core network 30. It may be foreseen that an identification of a right PDP context is realized via a mapping between International Mobile Subscriber Identity (IMSI) and packet data protocol (PDP) context. An IMSI may be understood as a unique subscription identifier that consists of the national mobile subscriber identity (NMSI) and the mobile country code (MCC). A PDP may be understood as a protocol which transmits data as discrete units known as packets. The term "Packet data protocol" may refer to standardized packet data protocols such as X.25 or IP. The right PCRF 34 and GGSN 33 are retrieved by extracting the IP address from the PDP context information and the mapping of the PCRF 34 and GGSN 33 are based on the Internet Protocol Connectivity Access Network (IP-CAN).

In other words, there is provided a solution for controlling traffic of congested cells by combining information of the radio access network 20 and the core network 30. The information of the radio access network 20 may be received by the OSS 31. In case of high cell load detection based on measurements retrieved for example from the RAN, it may be provided that a plurality of UEs 10 or all UEs 10 located in the congested cell are identified and their respective IMSIs are determined. The corresponding PDP context for each IMSI may be retrieved from the information stored in the HSS. For that purpose the HSS may be queried for each IMSI to retrieve the right PDP context. The right PCRF may be derived from the IP address contained as information in the PDP context. Different elements or different UEs 10 and hence, PDP contexts may be served by different PCRFs. Hence, the following features may be initiated in parallel at different PCRFs 34. In general a PCRF 34 is responsible for more than one GGSN 33. For a PCRF 34 to identify the right GGSN 33 for the respective PDP context, the information in the IPCAN session may be used for the right mapping between the PCRF 34 and the GGSN 30. The IPCAN session may be established when the UE 10 sets up the PDP context. Upon reception of a high cell load trigger by the right PCRF 34, the PCRF 34 evaluates the trigger and may enforce the policies for high cell load only for the PDP context belonging to the congested cell. The trigger to the PCRF 34 may be sent out, for example via the OSS 31 for each PDP context in the congested cell.

There is provided a policy control enabled bandwidth management. In case a scheduler-based solution that tries to avoid congestion is not possible, e.g. in case of HSPA multi-vendor solution that does not support packet marking respectively application aware scheduling and packet treatment in the RAN, then it may be foreseen to detect "high" cell load conditions in real-time, where higher priority traffic gets insufficient resources, such as requested throughput higher than provided throughput, due to the behavior of lower priority traffic, e.g. continuously requesting resources. Lower priority traffic can then be throttled in the core network depending on the measured load level.

A central question in this context may be how to get in real-time an indication of the cell load for the best effort traffic (non-GBR) to avoid that performance sensitive applications may be impacted. The metric should be rather simple and based on very basic information available in the network. One solution may be to derive it from the QoE of applications. As an example, assuming that downloading a typical web page of 1 MB in less than 3 sec yields the minimum acceptable QoE, a minimum throughput of roughly 2.7 Mbps may be needed. The metric can thus be formulated as "Throughput (bytes per second) of (pre-defined) percentage of active bearers with non-GBR traffic classes below (predefined) minimum threshold during (several) measurement intervals". The variables in this proposed definition may be subject to operator policy. Also, more elaborated metrics may be conceivable, e.g. considering further parameters besides throughput, or considering different application requirements.

Figure 3:
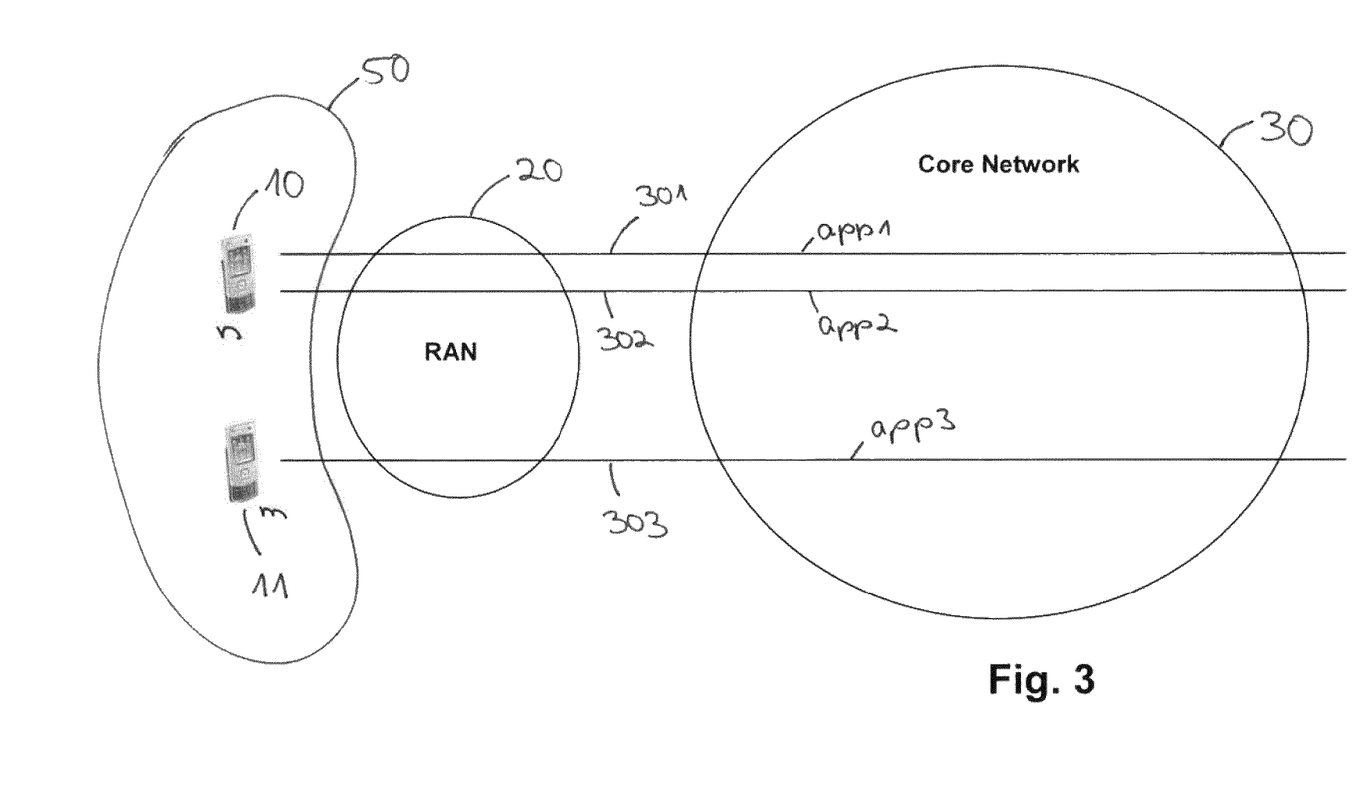
FIG. 3 illustrates an exemplary embodiment of a traffic control treatment in a core network.

FIG. 3 illustrates an example of traffic control in a core network based on the example of FIG. 2 comprising several aspects of the present invention. Two subscribers 10, 11 are located in a same congested cell 50. In this example there are three different applications running, one HTTP browsing session (app1) and a P2P file download (app2) by the first subscriber (=n) 10 with IMSI_n and one life video stream (app3) consumed by the second subscriber (=m) 11 with IMSI_m. The cell 50 may be in high cell load, e.g. due to unfavorable radio conditions and/or too many users and/or services and/or resource requests, and the QoE may be considerable degraded for the video stream (app3) as well as the browsing session (app1). The OSS 31, shown in FIG. 2, installed in the core network 30 determines the PDP contexts for IMSI_n and IMSI_m, for example PDP CTX_n,m and sends a trigger for PDP CTX_n and PDP CTX_m to PCRF_i. In this example it is assumed that one PCRF serves all subscribers 10, 11 of the congested cell 50. The PCRF_i determines the right GGSN_i for the two PDP contexts with the help of the IPCAN_n,m and sends the policies for high cell load for those two contexts to the right GGSN_i 33. This policy may indicate to throttle P2P traffic in case of congestion. With the help of deep packet inspection (DPI) it is known in the GGSN_i 30 that there is one traffic stream of the PDP CTX_n belonging to P2P file sharing application. The corresponding packets are throttled. The other packets of PDP CTX_n are left untouched since they belong to the HTTP browsing session of the same user. Also, the packets of PDP CTX_m are left untouched as they pertain to a live stream, which is not affected by the policy of the core network 30.

With other words, in FIG. 3 there are two users 10, 11, wherein user 10 is consuming a HTTP browsing session and a P2P file downloading at the same time. User 11 is doing live video streaming in parallel. Both users 10, 11 are located in the same high loaded cell 50. All PDP contexts indicated by PDP CTX_n, here 301, 302, 303 in FIG. 3 belong to the same congested cell 50. According to a mechanisms provided in the core network 30 based on information received from the RAN 20, it is possible to select a special application of a certain user or subscriber. In the case of FIG. 3 the application for selecting or filtering is the P2P file downloading which is identified to belong to the user 10 and which may be throttled down according to policies of the core network 30 initiated due to a high cell load of the congested cell 50.

Figure 4:
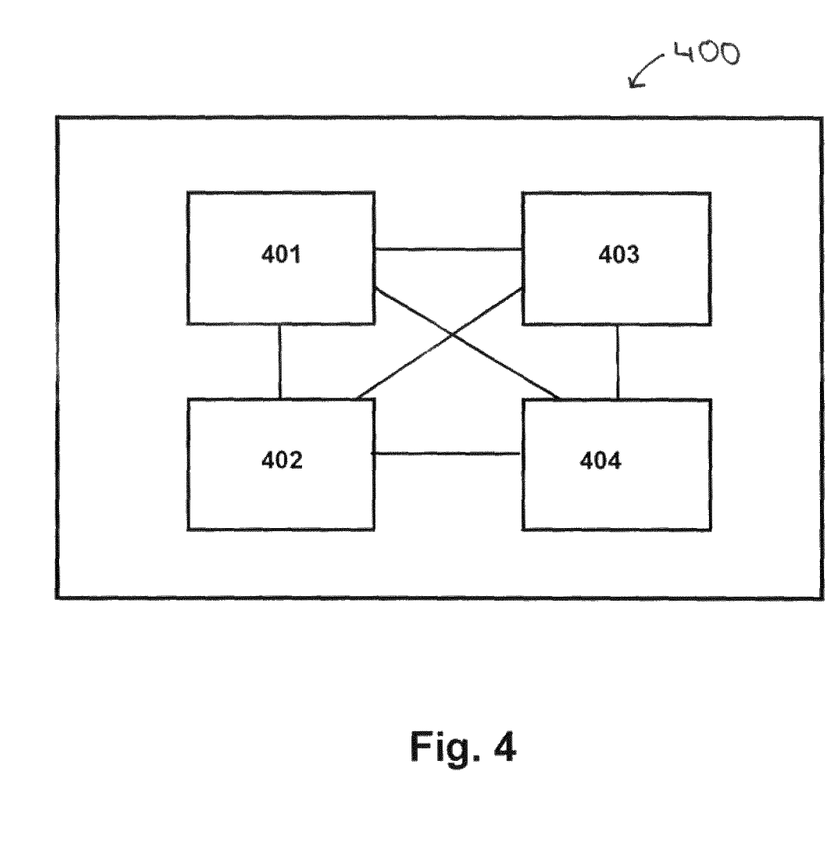
FIG. 4 illustrates an exemplary embodiment of a network element utilized in the core network.

FIG. 4 illustrates an exemplary network element 400 utilized in the core network 30 comprising features of the present invention. The network element 400 may be an OSS 31 as explained in relation to FIG. 2. The network element 400 in FIG. 4 comprises a receiving element 401 for receiving user-specific information comprising real-time information of a user 10, 11 in a congested cell 50. Furthermore, the network element 400 comprises an analyzing element 402 for analyzing the received user-specific information and a controlling element 403 for controlling the traffic flow in the core network 30 according to the analysis of the user-specific information in the analyzing element 403. In addition, the network element 400 may comprise a sending element 404 for sending information or trigger signals to a further network element.

Figure 5:
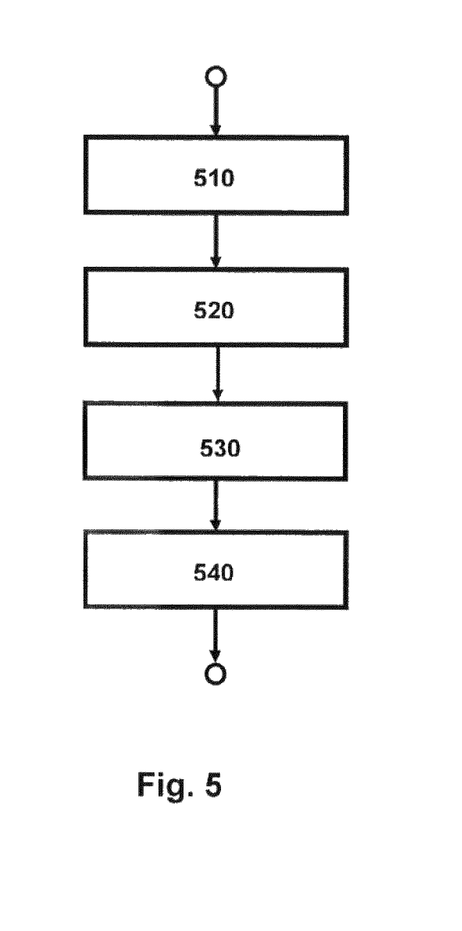
FIG. 5 illustrates an exemplary embodiment of a method according to the present invention.

FIG. 5 illustrates an exemplary method comprising features of the present invention. The method in FIG. 5 may be performed for traffic flow treatment in a core network 30 of a communication network 100. In box 510 there is indicated to receive cell information from an access network of the communication network, wherein the received cell information comprises an indication of a congested cell of the communication network.

In box 520 there is indicated receiving subscriber specific information comprising real-time information of a subscriber in a cell of the communication network. Moreover, in box 530 there is indicated to analyze the received subscriber specific information. In box 540 there is indicated to control the traffic flow in the core network according to the analysis of the subscriber specific information. Further method features before, after or between these boxes 510, 520, 530, 540 of FIG. 5 may be possible without deriving from the idea of the present invention.

In summary it is provided method and network element for traffic flow treatment in a core network of a communication network. It is proposed a solution for 3G (HSPA), which solution may be applicable also for other technologies such as 4G, for selective packet treatment in the core based on high cell load triggers from, e.g. the OSS, and measurement reports retrieved from the RAN. It may be provided to identify all PDP contexts of a congested cell in the core and treat the traffic according to the policies of the PCRF. Moreover, it may be proposed that the identification of the right PDP contexts is realized via the mapping between IMSI and PDP context. The right PCRF and GGSN may be retrieved in a further step by extracting the IP address from the PDP context information and the mapping of PCRF and GGSN based on IPCAN information.

The following features are proposed:

In case of high cell load detection based on measurements retrieved e.g. from the RAN it may be possible that all devices located in the congested cell are identified and their respective IMSIs are determined.

It may be further provided that the corresponding PDP context for each IMSI is retrieved from the information stored in the HSS. For that purpose the HSS can be queried for each IMSI to retrieve the right PDP context.

In another aspect it may be that the right PCRF can be derived from the IP address contained as information in the PDP context. Different devices, and hence, PDP contexts might be served by different PCRFs. Hence, the following steps might be initiated in parallel at different PCRFs.

In general, a PCRF may be responsible for more than one GGSN. For a PCRF to identify the right GGSN for the respective PDP context, the information in the IPCAN session (that was established when the UE set up the PDP context) is used for the right mapping between PCRF and GGSN.

Upon reception of the high cell load trigger by the right PCRF, the PCRF evaluates the trigger and enforces the policies (for high cell load) only for the PDP context belonging to the congested cell. The trigger to the PCRF can be sent out, e.g. via the OSS for each PDP context of the congested cell.

For example the RNC may take cell-related measurements concerning the throughput of all active UEs located in a cell receiving interactive or best-effort (non-GBR) traffic or any other cell-related measurements or other non-cell-related measurements that might be needed to determine high cell load according to the desired high cell load definition. The measurements are provided to the OSS.

The OSS may provide the critical evaluation and coordination functions. The OSS may collect and may evaluate the measurements received from the RNCs in the network. The main part of the evaluation is based on the specific measurements described above. The OSS may include additional information into the evaluation. In case the evaluation detects that the cell is in high load or congested, e.g. the required throughput for certain type of applications (e.g. web browsing using non-GBR bearers) can not be provided in the cell, the OSS may determine the subscribers located in the identified cell. To this purpose, the OSS may request from the RNC (controlling the cell) the International Mobile Subscriber Identities (IMSI) of the subscribers located in the requested cell. This interface is one of the improvements provided by the invention as currently only the RNC knows the actual location of a subscriber.

The next step is the identification of the PCRF in charge of the bearers (PDP contexts) of the concerned subscribers. The OSS requests from the appropriate HSS (using the received IMSIs) information about the established PDP contexts of the individual subscribers. The received information includes also the address of the GGSN handling the PDP context.

The OSS determines for each GGSN the PCRF using the same mechanisms as the GGSN for PCRF selection. The OSS informs the identified PCRFs about the high load condition in the cell and the impacted subscribers.

For each impacted subscriber, the PCRF may re-evaluate the subscriber specific policies and the operator policies (including time of day, location) and determines the necessary modifications of the policies. Dependent on the subscriber subscriptions and operator policy, no modification may be required for priority subscribers (e.g. so called gold users). The policies may request the identification of certain applications (e.g. peer-to-peer file downloading traffic) and for example to throttle them or treat them differently in another way.

The PCRF may send the modified policy of the IPCAN session to the responsible GGSN. Dependent on the requested policy, the GGSN may then for example throttle IP flows carrying the requested applications and/or mark packets for further load-dependent processing in the RNC (dependent on the functionality provided by the GGSN and the RNC in a multi-vendor environment).

In current solutions the decision to throttle traffic of certain applications is based on statistics (e.g., to throttle traffic in busy hours where the busy hours are identified via offline analysis of RNC measurements). As busy hours are different for each cell and may vary from day to day this solution is inaccurate. Another solution analyses TCP flows via DPI and tries to detect cells with high load conditions based on behavior of the TCP protocol. As there is no information which flows are handled in which cell, the conclusion of the analysis of the various IP flows may lead to an inaccurate result. Thus, the present solutions provided herewith have several advantages with more accurate results compared to the current solutions.

Exemplary embodiments have been described for 3GPP version of 3G technology. Similar solutions may be utilized in other versions of 3G technologies as well as 4G technology, such as Long Term Evolution (LTE) technology of 3GPP or others, or a further generation or version thereof.

In general, it is to be noted that respective functional elements according to above-described aspects can be implemented by any known means, either in hardware and/or software, respectively, if it is only adapted to perform the described functions of the respective parts. The mentioned method steps or messages may be realized in individual functional blocks or by individual devices, or one or more of the method steps can be realized in a single functional block or by a single device.

Furthermore, method steps and functions likely to be implemented as software code portions and being run using a processor at one of the entities are software code independent and can be specified using any known or future developed programming language such as e.g. Java, C++, C, and Assembler Method steps and/or devices or means likely to be implemented as hardware components at one of the entities are hardware independent and can be implemented using any known or future developed hardware technology or any hybrids of these, such as MOS, CMOS, BiCMOS, ECL, TTL, etc, using for example ASIC components or DSP components, as an example. Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to those skilled in the art.

The network devices or network elements and their functions described herein may be implemented by software, e.g. by a computer program product for a computer, or by hardware. In any case, for executing their respective functions, correspondingly used devices, such as an interworking node or network control element, like an MGCF of an IMS network comprise several means and components (not shown) which are required for control, processing and communication/signaling functionality. Such means may comprise, for example, a processor unit for executing instructions, programs and for processing data, memory means for storing instructions, programs and data, for serving as a work area of the processor and the like (e.g. ROM, RAM, EEPROM, and the like), input means for inputting data and instructions by software (e.g. floppy diskette, CD-ROM, EEPROM, and the like), user interface means for providing monitor and manipulation possibilities to a user (e.g. a screen, a keyboard and the like), interface means for establishing links and/or connections under the control of the processor unit (e.g. wired and wireless interface means, an antenna, etc.) and the like.

For the purpose of the present invention as described herein above, it should be noted that:

an access technology via which signaling is transferred to and from a network element or node may be any technology by means of which a node can access an access network (e.g. via a base station or generally an access node). Any present or future technology, such as 3G or 4G, and the like may be used;

usable access networks may be any device, apparatus, unit or means by which a station, entity or other user equipment may connect to and/or utilize services offered by the access network; such services include, among others, data and/or (audio-) visual communication, data download etc.;

a user equipment may be any device, apparatus, unit or means by which a system user or subscriber may experience services from an access network, such as a mobile phone, personal digital assistant PDA, or computer;

method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, apparatuses, units or means likely to be implemented as hardware components at a terminal or network element, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

Although described above mainly with respect to methods, procedures, an apparatus and modules thereof, it is to be understood that the present invention also covers a computer program products for implementing such methods or procedures and/or for operating such apparatuses or modules, as well as computer-readable (storage) media for storing such computer program products. The present invention also covers any conceivable combination of method steps and operations described above, and any conceivable combination of nodes, apparatuses and modules described above, as long as the above-described concepts of methodology and structural arrangement are applicable.

Furthermore, the network devices or network elements and their functions described herein may be implemented by software, e.g. by a computer program product for a computer, or by hardware. In any case, for executing their respective functions, correspondingly used devices, such as an interworking node or network control element, like an MGCF of an IMS network comprise several means and components (not shown) which are required for control, processing and communication/signaling functionality. Such means may comprise, for example, a processor unit for executing instructions, programs and for processing data, memory means for storing instructions, programs and data, for serving as a work area of the processor and the like (e.g. ROM, RAM, EEPROM, and the like), input means for inputting data and instructions by software (e.g. floppy diskette, CD-ROM, EEPROM, and the like), user interface means for providing monitor and manipulation possibilities to a user (e.g. a screen, a keyboard and the like), interface means for establishing links and/or connections under the control of the processor unit (e.g. wired and wireless interface means, an antenna, etc.) and the like.

Many modifications and other embodiments of the inventions set forth herein will come to mind to one skilled in the art to which these inventions pertain having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

In this context, "first", "second", "third", etc. in relation to messages or devices or network devices may not be understood as hierarchy, it should be understood only to distinguish different messages or devices from each other.

LIST OF ABBREVIATIONS 3G 3rd generation mobile communications
4G 4th generation mobile communications
3GPP 3rd Generation Partnership Project
BTS Base Transceiver Station
GGSN Gateway GPRS Support Node
HSPA High Speed Packet Access
IMS IP Multimedia System
IPCAN Internet Protocol Connectivity Access Network
IMS IP Multimedia Subsystem
IMSI International Mobile Subscriber Identity
IT Information Technology
LTE Long Term Evolution
MSC Mobile Switching Center
MGCF Mobile Gateway Control Function
OSI Open Systems Interconnection
OSS Operations Support System
PCEF Policy and Charging Enforcement Function
PCRF Policy and Charging Rules Function
PDP Packet Data Protocol
PS Packet Switched (IP based bearer service)
QoE Quality of Experience
RAN Radio Access Network
RNC Radio Network Controller
RTP Real Time Protocol
SGSN Serving GPRS Support Node
SIM Subscriber Identity Module
SIP Session Initiation Protocol
TCP Transmission Control Protocol
TDF Traffic Detection Function
UE User Equipment

The invention claimed is:

1. A method for traffic flow treatment in a core network of a communication network, the method comprising:
   receiving cell information from an access network of the communication network, wherein the received cell information comprises an indication of a congested cell of the communication network;
   receiving subscriber specific information comprising real-time information of a subscriber in a cell of the communication network;
   analyzing the received subscriber specific information to identify at least one application run by the subscriber; and
   controlling the traffic flow in the core network for each of the at least one application in accordance with the received cell information including the indication of the congested cell.

2. The method according to claim 1, further comprising: receiving cell information as a real-time information.

3. The method according to claim 1, further comprising: identifying a congested cell utilizing information from a RAN.

4. The method according to claim 1, further comprising: receiving information to identify subscriber specific information of a subscriber located in the congested cell.

5. The method according to claim 1, further comprising: sending a trigger signal for updating a policy of the subscriber in the core network.

6. The method according to claim 1, further comprising: reporting detected service traffic within the core network.

7. The method according to claim 1, further comprising: controlling data flow of a certain kind.

8. The method according to claim 1, further comprising: updating subscriber specific policy in the core network.

9. The method according to claim 1, further comprising: controlling the traffic flow in the core network according to policies of the core network.

10. The method according to claim 1, further comprising: utilizing packet data protocol (PDP) context in the core network.

11. The method according to claim 1, further comprising: receiving application information.

12. The method according to claim 1, further comprising: utilizing information from an internet protocol connectivity access network (IPCAN) session in the core network.

13. A network element installed in a core network, the network element comprising:
- at least one memory comprising computer program code;
- at least one processor;
- wherein the at least one memory and the computer program code are configured, with the at least one processor, to cause the network element at least to:
- receive cell information and for receiving subscriber specific information comprising real-time information of a subscriber in a congested cell of the communication network;
- analyze the cell load information and the received subscriber specific information to identify at least one application run by the subscriber; and
- send controlling information in order to control the traffic flow in the core network for each of the at least one application in accordance with the received cell information including the indication of the congested cell.

14. A computer program embodied on a non-transitory computer-readable medium, comprising code portions for causing a network element on which the computer program is executed, to carry out a method comprising:
- receiving cell information from an access network of the communication network, wherein the received cell information comprises an indication of a congested cell of the communication network;
- receiving subscriber specific information comprising real-time information of a subscriber in a cell of the communication network;
- analyzing the received subscriber specific information to identify at least one application run by the subscriber; and
- controlling the traffic flow in the core network for each of the at least one application in accordance with the received cell information including the indication of the congested cell.

* * * * *